United States Patent
Dowty et al.

(10) Patent No.: US 11,827,359 B2
(45) Date of Patent: Nov. 28, 2023

(54) DEVICES FOR HIC REDUCTION

(71) Applicant: B/E Aerospace, Inc., Winston-Salem, NC (US)

(72) Inventors: Mark B. Dowty, Rural Hall, NC (US); Jonathon Jarvis, Pfafftown, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 8 days.

(21) Appl. No.: 17/711,702

(22) Filed: Apr. 1, 2022

(65) Prior Publication Data

US 2023/0312097 A1  Oct. 5, 2023

(51) Int. Cl.
*B64D 11/06* (2006.01)

(52) U.S. Cl.
CPC ............................... *B64D 11/0619* (2014.12)

(58) Field of Classification Search
CPC ...... B64D 11/06; B64D 11/0619; B60N 2/42; B60N 2/4207; B60N 2/4214; B60N 2/4228; B60N 2/427; B60N 2/42709; B60N 2/4279; B60N 2/42745; B60N 2/42772; B60N 2/42781; B60N 2/433; B60R 21/02; B60R 21/04; B60R 2021/0004
USPC ..... 297/216.1, 216.12, 216.13, 217.1, 217.2, 297/217.3
See application file for complete search history.

(56) References Cited

U.S. PATENT DOCUMENTS

| | | | | |
|---|---|---|---|---|
| 3,715,130 A | * | 2/1973 | Harada et al. | B60R 21/20 280/751 |
| 3,877,749 A | * | 4/1975 | Sakurai | B60N 2/4256 297/488 |
| 3,951,429 A | * | 4/1976 | Satzinger | B60N 2/4256 296/68.1 |
| 4,335,918 A | * | 6/1982 | Cunningham | B60N 2/4221 296/68.1 |
| 5,131,286 A | * | 7/1992 | Sturges | B62D 1/195 188/371 |
| 5,549,327 A | * | 8/1996 | Rusche | B60R 21/04 280/751 |
| 5,836,547 A | * | 11/1998 | Koch | B64D 25/04 297/216.12 |
| 6,062,642 A | * | 5/2000 | Sinnhuber | B60N 2/4279 297/216.13 |
| 6,142,563 A | * | 11/2000 | Townsend | B60N 2/4228 297/216.13 |
| 6,224,131 B1 | * | 5/2001 | Shammout | B60N 2/4279 296/68.1 |

(Continued)

FOREIGN PATENT DOCUMENTS

| CN | 108945111 A | 12/2018 |
|---|---|---|
| CN | 108909670 B | 2/2020 |

(Continued)

*Primary Examiner* — James M Ference
(74) *Attorney, Agent, or Firm* — Suiter Swantz pc llo

(57) ABSTRACT

A passenger seat is described which satisfies a head-injury criterion (HIC). To satisfy the HIC, the passenger seat translates or pivots one or more components of the seatback towards a passenger sitting behind the passenger seat. By translating and/or pivoting the components of the seatback towards the passenger, a crush zone for the passenger seat may be increased, thereby increasing the impact time and correspondingly decreasing the forces felt by the passenger.

13 Claims, 14 Drawing Sheets

(56) References Cited

U.S. PATENT DOCUMENTS

| | | | | |
|---|---|---|---|---|
| 6,227,563 B1* | 5/2001 | Talisman | | B60R 21/00 |
| | | | | 280/735 |
| 7,040,658 B2* | 5/2006 | Kellas | | H03G 3/3036 |
| | | | | 280/751 |
| 7,357,415 B2* | 4/2008 | Enders | | B60R 21/02 |
| | | | | 280/753 |
| 7,597,393 B1* | 10/2009 | Tuccinardi | | B60R 11/0211 |
| | | | | 297/217.3 |
| 7,878,566 B2* | 2/2011 | Boggess | | B60R 11/02 |
| | | | | 296/187.05 |
| 7,959,226 B2* | 6/2011 | Hattori | | B60R 11/0235 |
| | | | | 297/188.05 |
| 8,276,955 B2* | 10/2012 | Baccouche | | B60R 19/34 |
| | | | | 293/133 |
| 8,398,113 B2* | 3/2013 | Choi | | B60R 21/2346 |
| | | | | 280/730.1 |
| 8,602,183 B2* | 12/2013 | VandenBerge | | F16F 7/128 |
| | | | | 188/372 |
| 9,487,157 B1* | 11/2016 | Vinton | | B60R 11/0235 |
| 9,682,662 B2* | 6/2017 | Vinton | | B60N 2/42 |
| 9,868,372 B2* | 1/2018 | McCoy | | B60N 2/4221 |
| 10,414,501 B2* | 9/2019 | Thompson | | B64D 11/0619 |
| 10,479,307 B2* | 11/2019 | Kim | | B60N 2/4221 |
| 10,525,899 B2* | 1/2020 | Mullen | | B60R 11/0235 |
| 10,953,810 B2* | 3/2021 | Hernandez | | B60R 11/0235 |
| 2001/0015548 A1* | 8/2001 | Breed | | B60R 21/214 |
| | | | | 280/735 |
| 2001/0048215 A1* | 12/2001 | Breed | | B60N 2/0276 |
| | | | | 280/728.1 |
| 2002/0027346 A1* | 3/2002 | Breed | | B60R 21/232 |
| | | | | 280/735 |
| 2002/0125691 A1* | 9/2002 | Conlee | | B60R 21/2338 |
| | | | | 280/730.1 |
| 2003/0184070 A1* | 10/2003 | Vidal | | F16F 7/125 |
| | | | | 280/752 |
| 2004/0007906 A1* | 1/2004 | Park | | B60N 2/879 |
| | | | | 297/217.3 |
| 2005/0287371 A1* | 12/2005 | Chaudhari | | B60R 19/18 |
| | | | | 428/480 |
| 2008/0015753 A1* | 1/2008 | Wereley | | B60N 2/522 |
| | | | | 297/303.4 |
| 2009/0001786 A1* | 1/2009 | Haglund | | B60N 2/888 |
| | | | | 297/216.14 |
| 2009/0008974 A1* | 1/2009 | Hattori | | B60R 11/0235 |
| | | | | 297/217.3 |
| 2010/0027231 A1* | 2/2010 | Chang | | F16F 1/3732 |
| | | | | 267/141 |
| 2011/0316311 A1* | 12/2011 | Westerink | | B64D 11/00151 |
| | | | | 297/217.3 |
| 2013/0009430 A1* | 1/2013 | Islam | | B60R 21/16 |
| | | | | 280/748 |
| 2013/0045044 A1* | 2/2013 | Akiyama | | F16F 15/08 |
| | | | | 403/291 |
| 2014/0015290 A1* | 1/2014 | Saada | | B64D 11/06 |
| | | | | 297/216.13 |
| 2015/0202999 A1* | 7/2015 | Jafri | | B64D 11/0015 |
| | | | | 297/216.12 |
| 2015/0367943 A1* | 12/2015 | Saada | | B64D 11/06 |
| | | | | 297/216.13 |
| 2016/0176357 A1* | 6/2016 | Maslakow | | F16M 13/00 |
| | | | | 29/428 |
| 2016/0297376 A1* | 10/2016 | Chen | | F16M 13/02 |
| 2016/0304046 A1* | 10/2016 | McCoy | | B60R 21/02 |
| 2017/0050602 A1* | 2/2017 | Vinton | | B60N 2/809 |
| 2017/0129413 A1* | 5/2017 | Yu | | F16M 13/02 |
| 2017/0144612 A1* | 5/2017 | Vinton | | B60R 11/0229 |
| 2018/0162253 A1* | 6/2018 | Faruque | | B60N 3/004 |
| 2020/0148081 A1* | 5/2020 | Marais | | B64D 25/04 |
| 2020/0339264 A1* | 10/2020 | Baldomero | | B64D 11/0619 |

FOREIGN PATENT DOCUMENTS

| | | |
|---|---|---|
| CN | 108909850 B | 7/2020 |
| DE | 102007001767 | 5/2012 |
| GB | 2510697 A | 8/2014 |
| KR | 20050101978 A | 10/2005 |
| KR | 100692075 B1 | 3/2007 |

* cited by examiner

100

DEVICES FOR HIC REDUCTION

TECHNICAL FIELD

The present invention generally relates to passenger seating, and more specifically to head injury mitigation due to head impact loads.

BACKGROUND

There is a continual drive to make seat systems for passenger aircraft lighter, thinner and more capable, such as with larger video systems. However, these design incentives may be at odds with passenger safety. The Federal Aviation Regulations (FAR) 25.562 sets a Head Injury Criterion (HIC) for aircraft passenger seats. The HIC requires the seat to manage the result of Head Impact loads such that a HIC score of less than 1000 is achieved during a prescribed 16 g dynamic crash test. The management of these loads have previously been accomplished by spacing the passengers' seats far enough apart so that a passenger's head will not make contact with the seat in front (severely limiting options for seating arrangements which increase the number of seats within the cabin). Another option includes a breakover mechanism built into the seat.

SUMMARY

A passenger seat is disclosed, in accordance with one or more embodiments of the present disclosure. In one illustrative embodiment, the passenger seat includes a seatback. In another illustrative embodiment, the passenger seat includes a bezel disposed on a rear surface of the seatback. In another illustrative embodiment, the passenger seat includes an accelerometer configured to generate a signal in response to detecting an acceleration indicative of an emergency event. In another illustrative embodiment, the passenger seat includes a slide mechanism coupled between the bezel and the seatback. In another illustrative embodiment, the slide mechanism is configured to translate the bezel relative to the seatback. In another illustrative embodiment, the translation of the bezel relative to the seatback causes the bezel to be disposed a distance from the seatback to act as a crushable space for a passenger sitting behind the passenger seat. In another illustrative embodiment, the passenger seat includes an actuator. In another illustrative embodiment, the actuator causes the slide mechanism to translate the bezel relative to the seatback in response to the actuator receiving the signal from the accelerometer. In another illustrative embodiment, the passenger seat includes an impact attenuator coupled to the slide mechanism. In another illustrative embodiment, the impact attenuator is configured to absorb an energy upon impact of the passenger with the bezel.

A passenger seat is disclosed, in accordance with one or more embodiments of the present disclosure. In one illustrative embodiment, the passenger seat includes a seatback including a pivot joint by which the seatback may be pivoted between an upright position and a recline position. In another illustrative embodiment, the passenger seat includes an accelerometer configured to generate a signal in response to detecting an acceleration indicative of an emergency event. In another illustrative embodiment, the passenger seat includes an actuator coupled to the seatback. In another illustrative embodiment, the actuator is configured to pivot the seatback from the upright position to the recline position towards a passenger sitting behind the passenger in response to receiving the signal from the accelerometer. In another illustrative embodiment, the rotation of the seatback causes the seatback to act as a crushable space for the passenger sitting behind the passenger seat.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
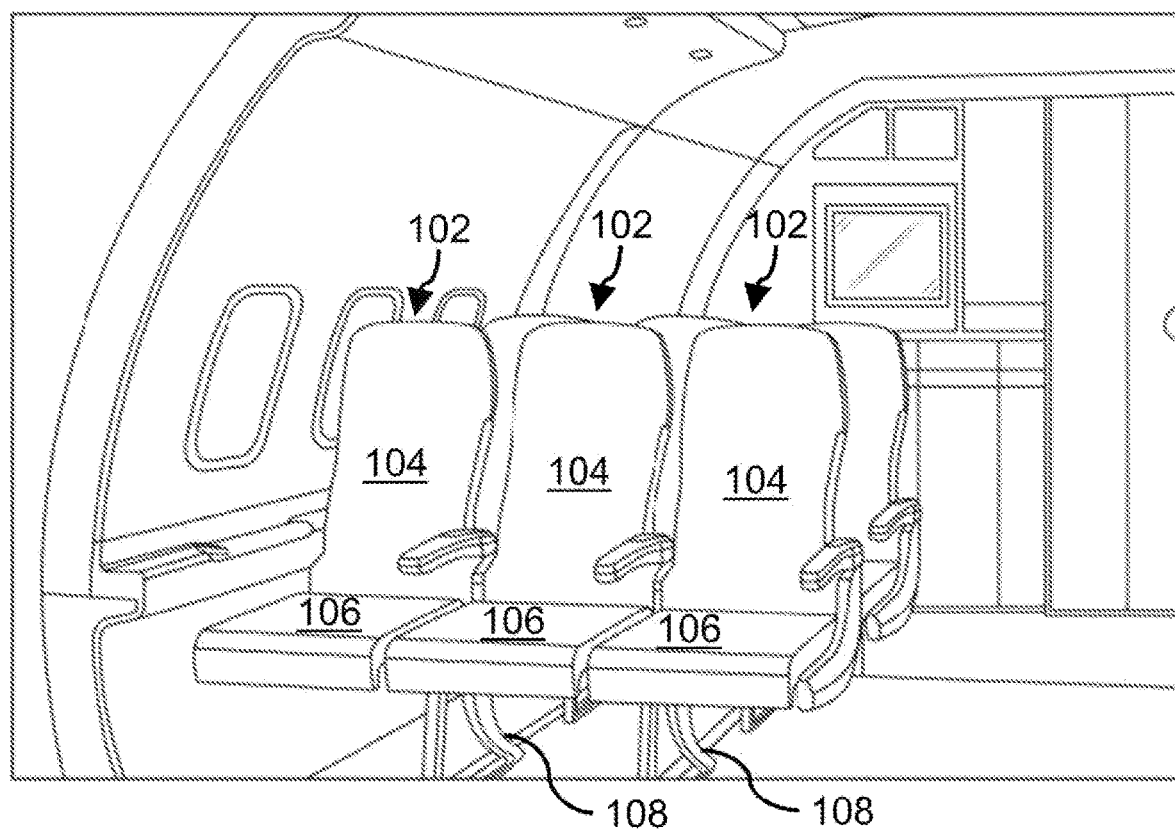
FIG. 1A depicts a perspective view of an aircraft including passenger seats, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1 b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Described herein are a series of devices or HIC systems that create a crush zone at the onset of a crash event using space typically reserved during standard operation. The HIC systems may increase a crush zone for a passenger sitting behind the passenger seat. As used herein the term crush zone includes any space over which the passenger's head is slowed and doesn't refer specifically to a crushable structure. To absorb energy the energy absorption system includes a stroke which exchanges distance for energy absorption (i.e., a crush zone, a crushable space, etc.). The HIC systems may include detecting an acceleration indicative of an emergency event, such as a crash event or a turbulence event, by an accelerometer. One or more surfaces of the passenger seat, such as, but not limited to, a bezel, a display, or a seatback, may then be moved in response to detecting the acceleration to create a crush zone. The passenger's head may then impact the surfaces, transferring an impact load to the surfaces, with such surface then moving to a new location upon absorbing the energy from the passenger's head.

The HIC systems may be incorporated directly at the impact area or in a nearby mechanism such as a seat back pivot joint. In a first example, the HIC system may move subcomponents of the passenger seat in order to isolate the amount of mass that must initially be moved during impact by the occupant's head. The passenger seat may include one or more components which function translate in response to detecting an emergency event. The components may be translated a select distance, which increases the crushable space of the passenger seat thereby providing for injury protective potential within the seatback. For example, the crushable space may be provided between the seat back structure and the video assembly. In a second example, the HIC system may provide for adjusting an angular position of the seatback subsequent to detecting an emergency event but prior to head impact with the seatback. The angular position of the seatback may be moved into a recline position, thereby increasing an amount of breakover distance available upon head impact as well as decreasing the distance the head travels prior to impact. The exemplary HIC systems may provide methods of energy absorption that can act independently or in concert. Furthermore, the HIC systems may be provided in combination with existing seat back breakover devices.

U.S. Pat. No. 10,414,501, titled "Seat back breakover with dynamically triggered actuator", filed on May 31, 2017, is incorporated herein by reference in the entirety.

Figure 1B:
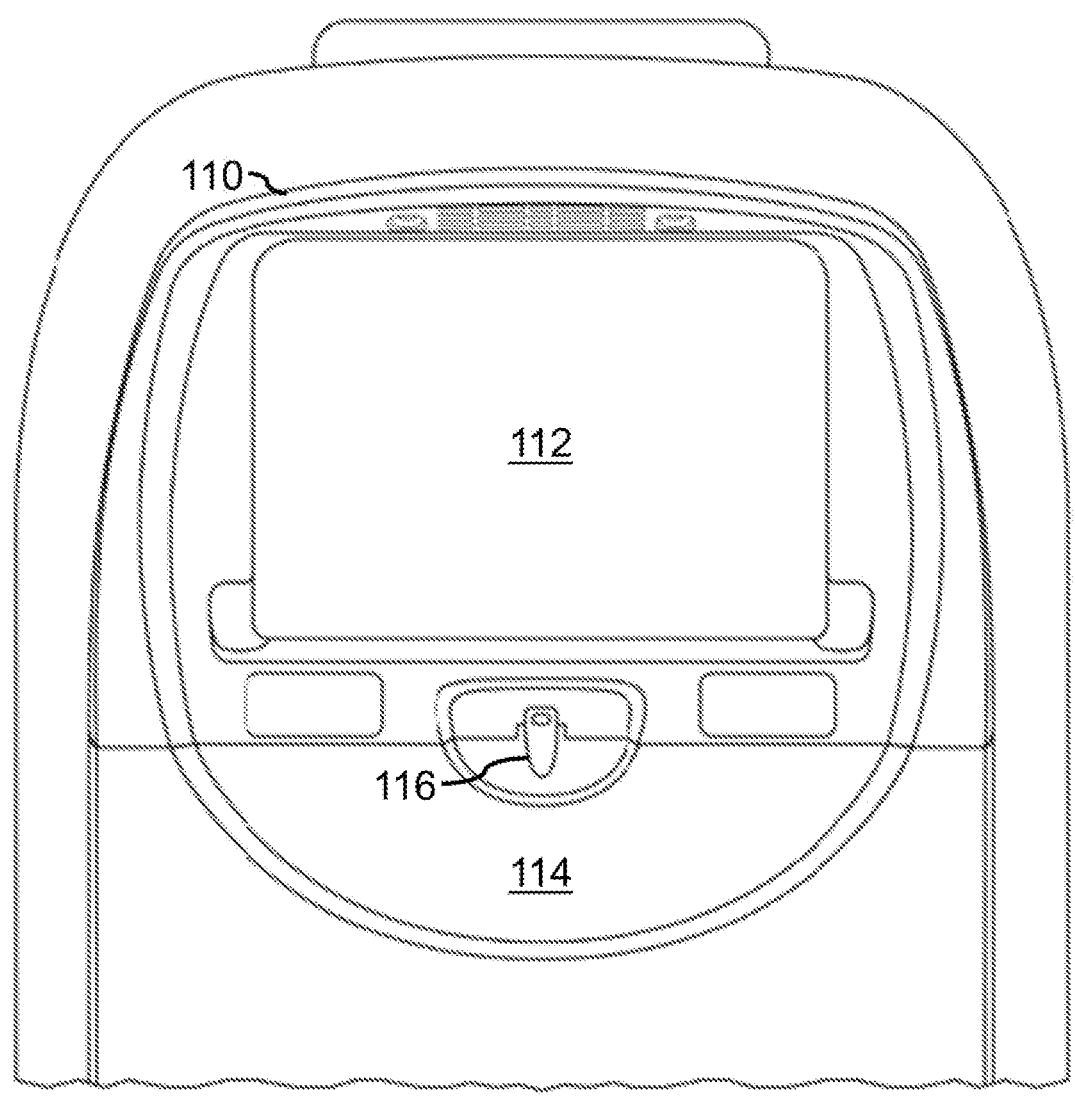
FIG. 1B depicts a rear view of a passenger seat, in accordance with one or more embodiments of the present disclosure.

Referring now to FIGS. 1A-1B, an example embodiment of an aircraft 100 that includes a plurality of passenger seats 102 is described, in accordance with one or more embodiments of the present disclosure. Each passenger seat 102 includes a seatback 104 and a seat pan 106. The passenger seat 102 also includes a leg 108 (also referred to as a seat support structure, a seat chassis, and the like) that is coupled to a floor (e.g., by a track) for providing structural support to the seat pan 106 and the seatback 104. In embodiments, the seatback 104 and the seat pan 106 may be separate structures and/or may include one or more shared components. For example, the seatback 104 and the seat pan 106 can have a shared cushion or covering. The seatback 104 may also be configured to move relative to the seat pan 106. For example, the seatback 104 can be configured to transition between upright and reclining positions. In embodiments, the seat pan 106 can also be actuated such that the passenger seat 102 may be configurable between an upright position and a bed position, although this is not intended to be a limitation of the present disclosure.

As shown in FIG. 1B, a rear seatback surface of the seatback 104 may include, but is not limited to, a bezel 110, a display 112, and a tray table 114. In embodiments with a bezel 110, the bezel 110 may be configured to at least partially surround the display 112. The bezel 110 may be fabricated from any material known in the art including, but not limited to, plastics, metals, and the like. The bezel 110 may include a tray table locking assembly 116 disposed within the bezel 110, wherein the tray table locking assembly 116 is configured to be actuated in order to lock the tray table 114 in a "closed" position, and release the tray table 114 into an "open" position. In embodiments, the seatback 104 may include one or more HIC systems disposed within a hollow section of the seatback 104. For example, the HIC systems may be provided between a frame of the seatback 104 and one or more of the bezel 110 and the display 112. By the HIC systems, one or more of the bezel 110 and the display 112 may be configured to be translated and/or pivoted for providing a crushable space. The crushable space may be provided in an emergency event to improve a head-impact criterion for a passenger sitting behind the passenger seat 102.

Figure 2:
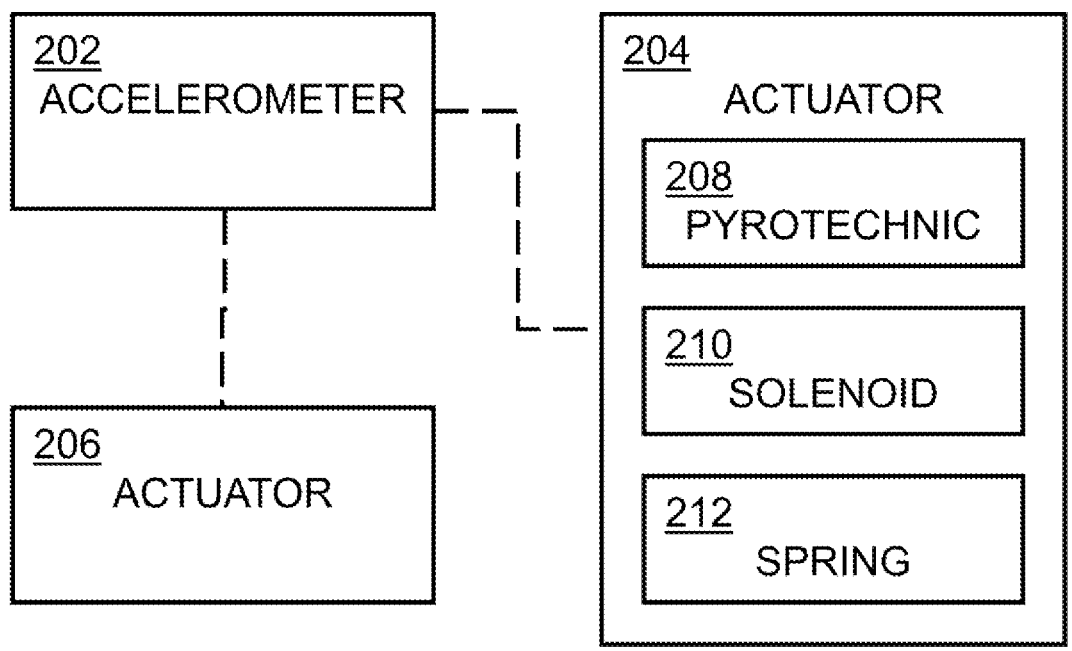
FIG. 2 depicts a simplified control diagram of a passenger seat, in accordance with one or more embodiments of the present disclosure.

FIG. 2 depicts a simplified schematic diagram of one or more components of a HIC system for the aircraft passenger seat 102, in accordance with one or more embodiments of the present disclosure. For example, the passenger seat 102 may include an accelerometer 202, an actuator 204, or an actuator 206. The actuator 204 may be provided for translating one or more components of the seatback and the actuator 206 may be provided for adjusting an angle of the seatback, as will be described further herein. By the actuator 204 and/or the actuator 206, the passenger seat 102 may meet a head-impact criterion while providing a tray table with reduced width. The actuator 204 and the actuator 206 may thus be considered one or more components of a HIC system which actively mitigates injuries by affecting a forward velocity of the passenger's head.

The actuator 204 and/or the actuator 206 may be engaged in response to receiving a signal from the accelerometer 202. The accelerometer 202 may be configured to detect one or more accelerations indicative of an emergency event and provide the signal to the actuator 204 and/or the actuator 206. The accelerations detected by the accelerometer 202 may correspond to a crash event, a turbulence event, or the like. The accelerometer 202 may also be configured to generate a signal in response to detecting the accelerations. For example, the accelerometer 202 may include one or more trigger conditions. Upon satisfaction of the trigger conditions the accelerometer 202 may generate the signal. The trigger conditions may generally include any suitable range of (de)acceleration, such as, but not limited to, detecting 16G of acceleration. Furthermore, the trigger conditions may be based on the direction of the acceleration.

In some instances, the actuator 204 and/or the actuator 206 may translate or pivot an associated component of the seatback within 200 milliseconds of receiving a trigger signal from the accelerometer 202. By performing actuation within the 200-millisecond timeframe, the components may be motivated to the desired position prior to head impact. For example, the actuator 204 may translate and/or pivot one or more rear components of the seatback, such as, but not limited to, the bezel or the video display within the 200-millisecond timeframe. By way of another example, the actuator 206 may pivot the entire seatback within the 200-millisecond timeframe.

The accelerometer 202 may be electrically coupled to one or more components of the passenger seat 102, such as, but not limited to, the actuator 204 or the actuator 206. For example, the accelerometer 202 may be electrically coupled to a wiring harness, or the like, which may be routed through the passenger seat 102 to the actuator 204 or the actuator 206. In some instances, the wiring harness may also provide electrical power to the actuator 204 or the actuator 206. For example, the wiring harness may provide aircraft line power, or the like. In other instances, the actuator 204 or the actuator 206 may be provided with power from a battery or other suitable power source. In a wired configuration, wires may be maintained such that connections cannot be reached and damaged through passenger use of the passenger seat 102. Although the accelerometer 202 has been described as being electrically coupled to one or more of the actuator 204 or the actuator 206, this is not intended as a limitation of the present disclosure. In some instances, the accelerometer 202 may be wirelessly coupled to the actuator 204 or the actuator 206, for providing the signal indicative of the emergency event. For example, the accelerometer 202, the actuator 204, and/or the actuator 206 may wirelessly communicate by a short-range wireless communication network, such as a Wi-Fi, Li-Fi, Bluetooth, Zigbee, or Ultra-Wide Band (UWB) network. For example, the wireless communication may occur by wireless communication circuitry, such as a radio, transceiver, and other associated circuitry, that allow the accelerometer 202, the actuator 204, and/or the actuator 206 to wireless communicate. Alternatively, the accelerometer 202 may be included in a common housing with the actuator 204 and/or the actuator 206.

The accelerometer 202 may generally be located in a number of locations within the aircraft. For example, the accelerometer 202 may be located on a frame portion (e.g., the leg 108, a frame 306, etc.) of the passenger seat 102. It is further contemplated that the accelerometer 202 may be associated with multiple of the passenger seats 102, such as, but not limited to, a seating row of the aircraft including two or more of the passenger seats 102. The accelerometer 202 may generally include any sensor for detecting the acceleration. In some instances, the accelerometer 202 may be a component of an inertial measurement unit (IMU) which may include the accelerometer 202, a gyroscope, a magnetometer, and the like.

In some instances, the actuator 204 includes a potential energy storage device. The actuator 204, in a first example, may be a pyrotechnic actuator 208. The pyrotechnic actuator may include, among other components, an electrically ignited pyrotechnic charge. Small pyrotechnic actuators can typically exert significant force (10's or 100's of pounds) and achieve actuation speeds as low as several milliseconds. Although the actuator 204 has been described as including a pyrotechnic actuator, this is not intended as a limitation of the present disclosure. The actuator 204 may also include a linear solenoid actuator 210. The linear solenoid may require a high drive current to exert significant force in a short time period, but a linear solenoid can be used thousands of times without replacement. The actuator 204 may also include a spring-loaded actuator 212. However, the use of the pyrotechnic actuator may be advantageous given the high energy density, as compared to the linear solenoid or the spring-loaded actuator, such that the spring-loaded actuator may require additional footprint to achieve a sufficient spring force to generate the motive force. However, the pyrotechnic actuator may be limited to a one time operation before replacement.

Similar to the actuator 204, the actuator 206 may include one or more of the pyrotechnic actuator 208, the linear solenoid actuator 210, or the spring actuator 212. Due to the actuator 206 pivoting the entire seatback, the forces required by the actuator 206 may be relatively higher than the forces required by the actuator 204. In this regard, the actuator 206 may be substantially larger and include a greater stored energy.

Referring now to FIGS. 3A-3D, an exemplary embodiment of one or more components of the passenger seat 102 is described. In embodiments, the passenger seat 102 includes one or more of a slide mechanism 302 and an impact attenuator 304. The slide mechanism 302 may be coupled between the bezel and the seatback. The slide mechanism 302 may translate the bezel relative to the seatback in response to receiving the signal from the accelerometer. For example, the slide mechanism 302 may be coupled to or otherwise include the actuator 204. The translation of the bezel relative to the seatback may then cause the bezel to be disposed a distance from the seatback to act as a crushable space for a passenger sitting behind the passenger seat. Although the slide mechanism 302 has been described as translating the bezel, this is not intended to be a limitation of the present disclosure. It is further contemplated that the slide mechanism 302 may translate one or more other surfaces of the passenger seat, such as, but not limited to, the display 112 which may be moved in addition to or separately from the bezel 110. The slide mechanism 302 may thus be provided to move a surface or another subcomponent of the passenger seat 102 towards a passenger sitting behind the passenger seat 102.

In embodiments, the impact attenuator 304 may be coupled to the slide mechanism 302. The impact attenuator may also absorb an energy upon impact of the passenger with the bezel. In particular, the impact attenuator 304 may absorb the energy after the bezel has been translated. The impact attenuator 304 may include a crushable material. For example, the crushable material may include, but is not limited to, a foam material, a material provided in a honeycomb structure (e.g., an aluminum honeycomb), and the like. The impact attenuator 304 may then absorb energy from a passenger impacting the bezel by a deformation of the crushable material.

Figure 3A:
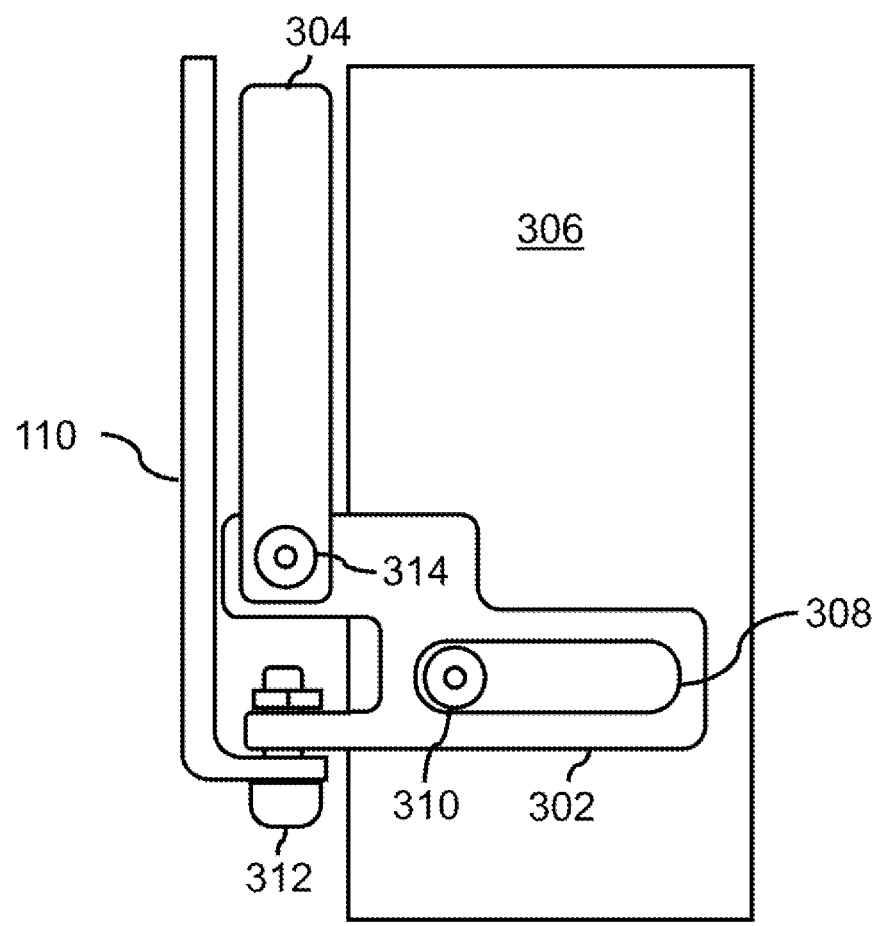
FIG. 3A depicts a side cross-section of a passenger seat, in accordance with one or more embodiments of the present disclosure.
Figure 3B:
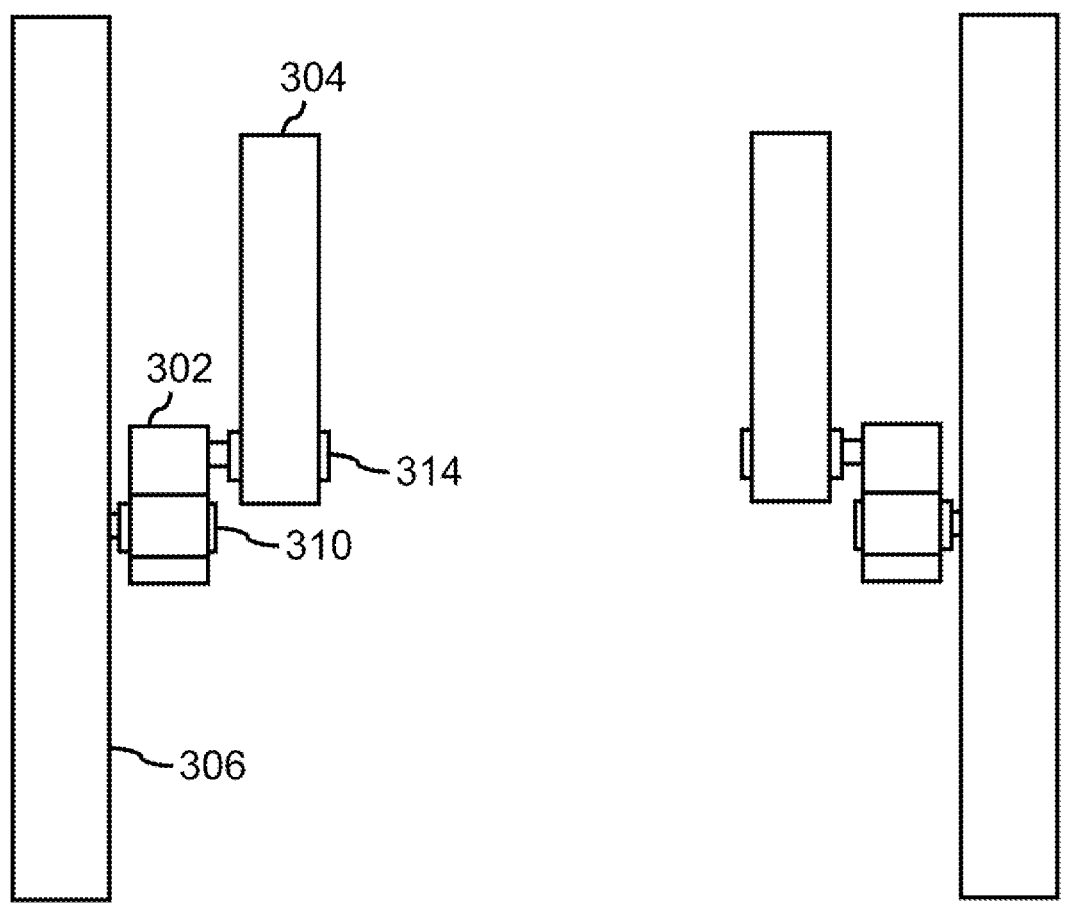
FIG. 3B depicts a partial rear view of a passenger seat, in accordance with one or more embodiments of the present disclosure.
Figure 3C:
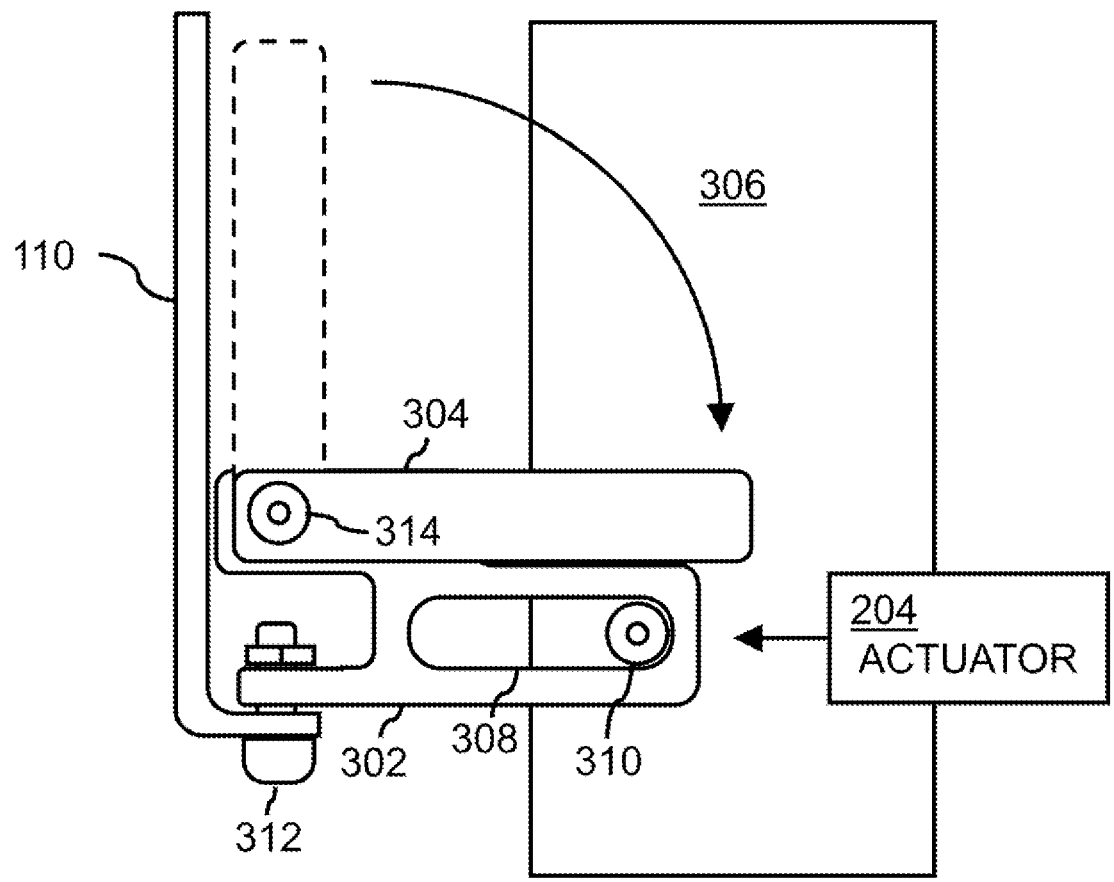
FIG. 3C depicts a side cross-section of a passenger seat, in accordance with one or more embodiments of the present disclosure.

As depicted in FIGS. 3A-3B, the bezel 110 is provided in a pre-crash state in which the bezel 100 is provided inside of the seatback 104. In particular, the impact attenuator 304 may be disposed adjacent to frame 306 of the seatback 104. After a signal indicative of an emergency event (e.g., a crash) has been sensed and received, the slide mechanism 302 may be pushed into the position shown in FIG. 3C-3D. The bezel 110 has been translated a distance away from the frame 306 of the seatback 104. The bezel 110 may be translated a select distance, such as, between three inches or less. For example, the slide mechanism 302 may be pushed into the position shown in FIG. 3C-3D by the actuator 204.

The impact attenuator 304 may rotate down from a first position to a second position as the bezel 110 is translated. In the first position, the impact attenuator 304 may be relatively flush with the bezel 110. By being flush with the bezel 110, the impact attenuator 304 may take up minimal space within the seatback 104, thereby having a minimal impact on the livable space within the aircraft 100 prior to deployment of the impact attenuator 304 (e.g., taking up space corresponding to the width of the impact attenuator 304). In the second position, the impact attenuator 304 is provided for increasing the crushable space between the bezel 110 and the seatback 104. For example, the impact attenuator 304 may increase the crushable space from 2 thousandths of an inch (0.0508 mm) to 1.5 inches (38.1 mm) in an exemplary configuration. As may be understood, the increase in the crushable space provided is not intended to be limiting and may based on one or more factors, such as, but not limited to, a width of the impact attenuator 304, a length of the impact attenuator 304, a stroke of the slide mechanism 302, a stroke of the actuator 204, and the like. In some instances, one or more of the actuator 204 and the slide mechanism 302 may provide between zero and three inches of travel, or more. Although not depicted, the impact attenuator 304 may contact a portion of the seatback 104 when in the second position. In this regard, the contact with the seatback may provide a backstop by which the impact attenuator 304 is crushed. As may be understood, the impact attenuator 304 may generally include any suitable shape. In embodiments, the impact attenuator 304 is molded to conform to the bezel 110, thereby minimally affecting the livable space.

In embodiments, the slide mechanism 302 may include a slot 308. The slot 308 may provide a coupling between the slide mechanism 302 and the frame 306. The frame 306 may also provide a coupling point for the slide mechanism 302. For example, the frames 306 may include a roller 310. The roller 310 may be disposed in the slot 308 of the slide mechanism 302, thereby allowing the slide mechanism 302 to translate relative to the frame 306 of the seatback 104. The roller 310 may act as a cam-follower for the slot 308. The roller 310 may include any roller, such as, but not limited to, cylindrical roller, a flanged roller, a V-shaped roller, U-shaped roller, and the like.

The passenger seat 102 may include a pivot joint 314 for rotating the impact attenuator 304. For example, the pivot joint 314 may couple the impact attenuator 304 and the slide mechanism 302. The term pivot joint may also be referred to herein as a pin joint, a revolute joint, or the like. Such pivot joint may generally be understood to include one degree of freedom allowing rotation about an axis. In some instances, the pivot joint 314 includes a spring-loaded pivot joint. In this regard, as the slide mechanism 302 is translated, the pivot joint 314 may cause the impact attenuator 304 to rotate from the first position to the second position. The impact attenuator 304 may thus be considered spring-tensioned prior to the emergency event.

The bezel 110 and/or the display 112 may generally be coupled to the slide mechanism 302 by a fastening means. As depicted, the bezel 110 include a bottom lip which is coupled to the slide mechanism 302 by a fastener 312. Such fastener 312 may generally include any fastener known in the art, such as, but not limited to, a pin, a rivet, or a bolt. The slide mechanism 302 may also include one or more recessed portions which may improve an ease-of-assembly for fastening the bezel to the slide mechanism 302 by the fastener 312.

In embodiments, one or more of the slide mechanism 302 or the actuator 204 include a shear pin (not depicted) or other sacrificial part. The shear pin may be incorporated in the slide mechanism 302 and/or the actuator 204 to prevent deployment under non-crash scenarios. The shear pin may be then sheared in response to the actuator 204 being engaged. Upon the shear pin becoming sheared, the slide mechanism 302 may then freely translate.

Figure 3D:
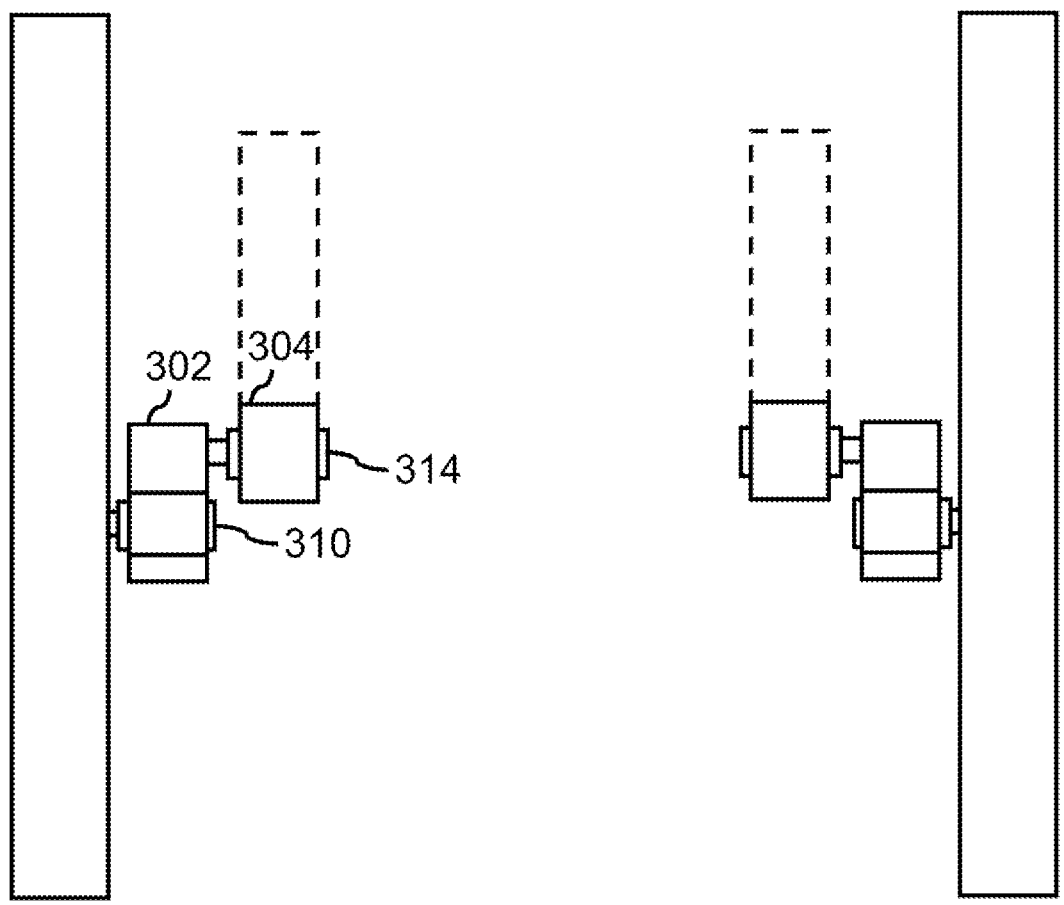
FIG. 3D depicts a partial rear view of a passenger seat, in accordance with one or more embodiments of the present disclosure.

The seatback 104 may include one or more the frames 306. For example, the seatback 104 may include two of the frames 306, with the frames 306 provided on a left-side and a right-side of the seatback 104, as is known in the art. Similarly, one or more HIC systems may be provided for each of the frames 306. As depicted in FIGS. 3B and 3D, the left-side frame and right-side frame may each include one of the HIC systems, although this is not intended to be limiting. It is further contemplated that multiple HIC systems may be provided on each frame. For example, the frame 306 may include multiple of the slide mechanism 302 and an associated impact attenuator. Furthermore, the impact attenuator 304 described is not intended to be limiting.

Figure 4A:
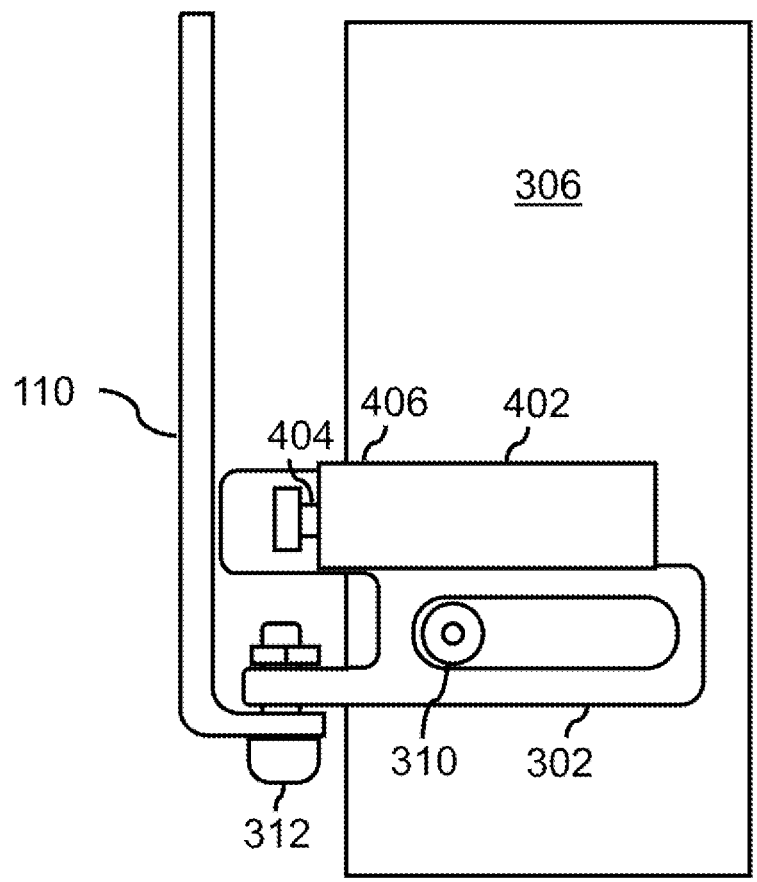
FIG. 4A depicts a side cross-section of a passenger seat, in accordance with one or more embodiments of the present disclosure.
Figure 4B:
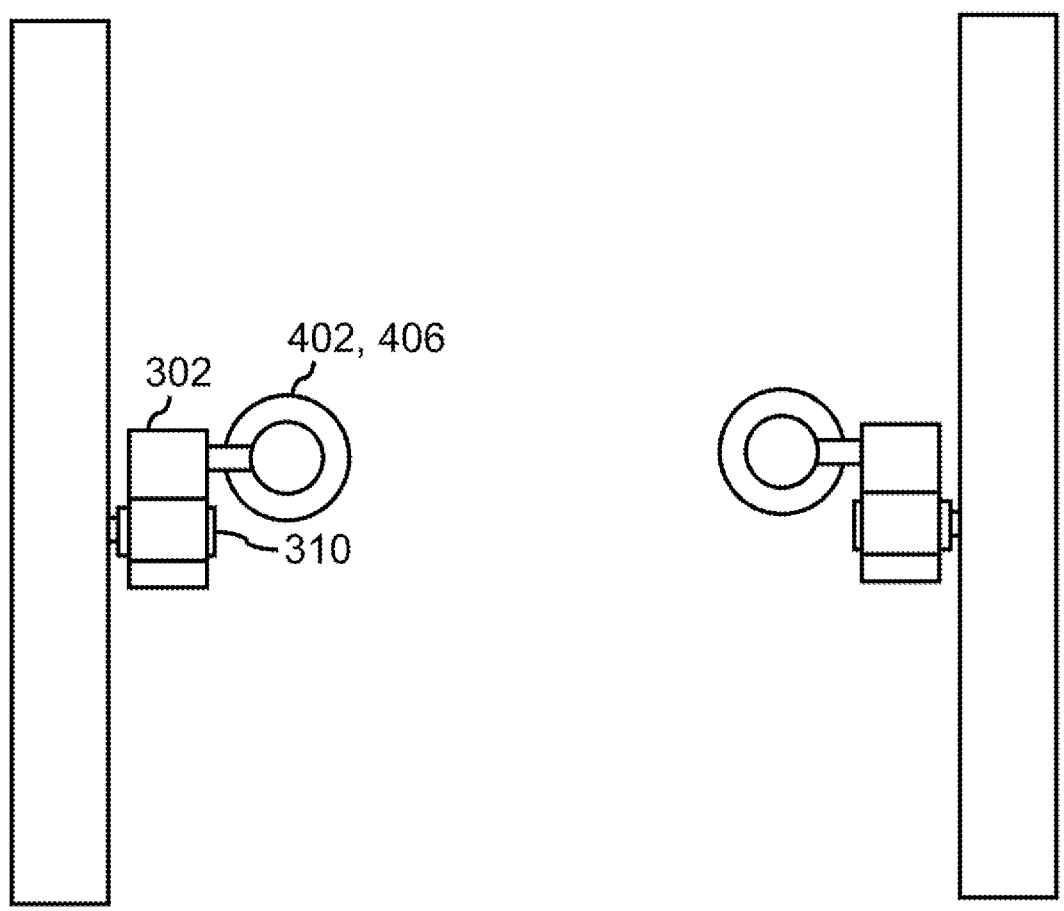
FIG. 4B depicts a partial rear view of a passenger seat, in accordance with one or more embodiments of the present disclosure.
Figure 4C:
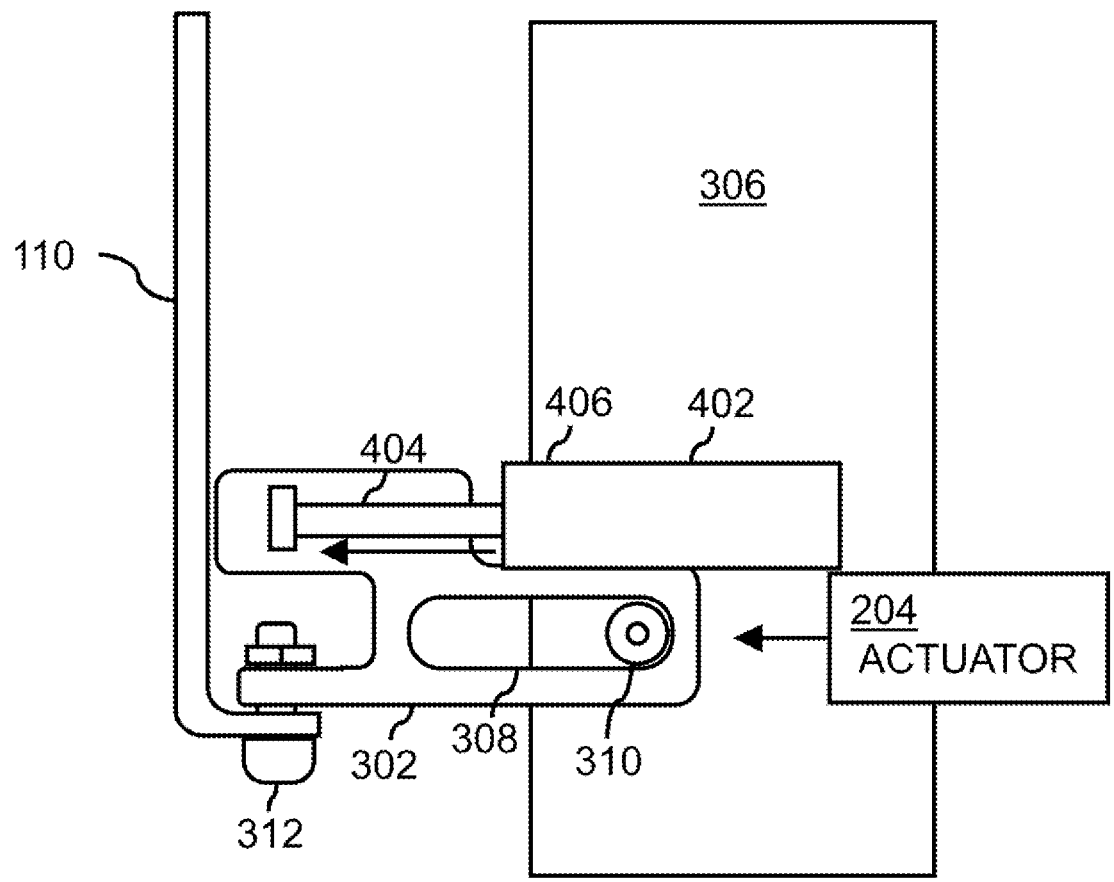
FIG. 4C depicts a side cross-section of a passenger seat, in accordance with one or more embodiments of the present disclosure.

Referring now to FIGS. 4A-4C, an exemplary embodiment of one or more components of the passenger seat 102 is described. In embodiments, the passenger seat 102 includes one or more of the slide mechanisms 302 and an impact attenuator 402. The impact attenuator 402 may be similar to the impact attenuator 302, with the exception that the impact attenuator 402 is provided in lieu of a crushable element. For example, the impact attenuator 402 may include a rod 404 and a cylinder 406, which function as a damping element. The damping element may include, but is not limited to, a one directional damping element. In this regard, the impact attenuator 402 may be provided so that when the rod 404 moves from a first position (FIG. 4A) to a second position (FIG. 4C), minimal damping occurs. Upon a passenger impacting the bezel 110, the impact attenuator 402 may then absorb energy or otherwise damp the motion on the return stroke of the rod 404, when the bezel 110 is impacted. The rod 404 may be coupled to the slide mechanism 302 and the cylinder 406 may be coupled to the frame 306. In this regard the damped motion of the rod 404 relative to the cylinder 406, may damp the motion of the slide mechanism 302 (and similarly the bezel 110 and passenger head) relative to the frame 306. The rod 404 may include any end for coupling to the slide mechanism 302, such as, but not limited to, a clevis rod end, a flange, or the like.

To achieve the one directional damping the impact attenuator 402 may include a check valve which allows the rod 404 to move to the second position with a minimal force requirement. This may be advantageous for rapidly positioning the rod 404, such as within a 200-millisecond timeframe. The check valve may then reduce a flow of hydraulic or pneumatic fluid within the cylinder 406 on the return stroke, thereby damping the rod 404. Similarly, the impact attenuator 402 may include a valve which is opened while the rod 404 is extending and closed once the rod 404 reaches the extended position.

In embodiments, the impact attenuator 402 includes the actuator 204, such that the impact attenuator 402 is spring loaded. By being spring loaded, the impact attenuator 204 may deploy automatically after being triggered by the accelerometer 202. It is further contemplated that the actuator 204 may be separate from the impact attenuator 402.

Figure 5A:
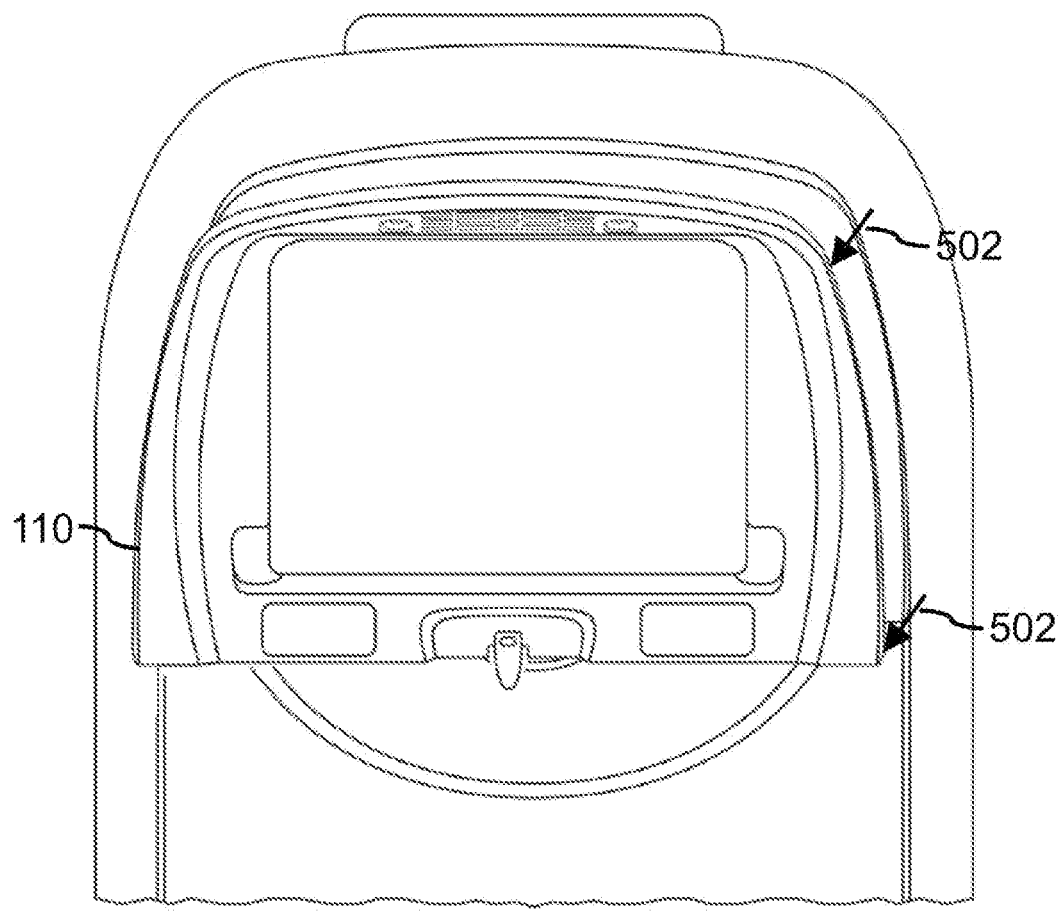
FIG. 5A depicts a rear view of a passenger seat with a bezel and a video display translated outward to create a crushable space, in accordance with one or more embodiments of the present disclosure.
Figure 5B:
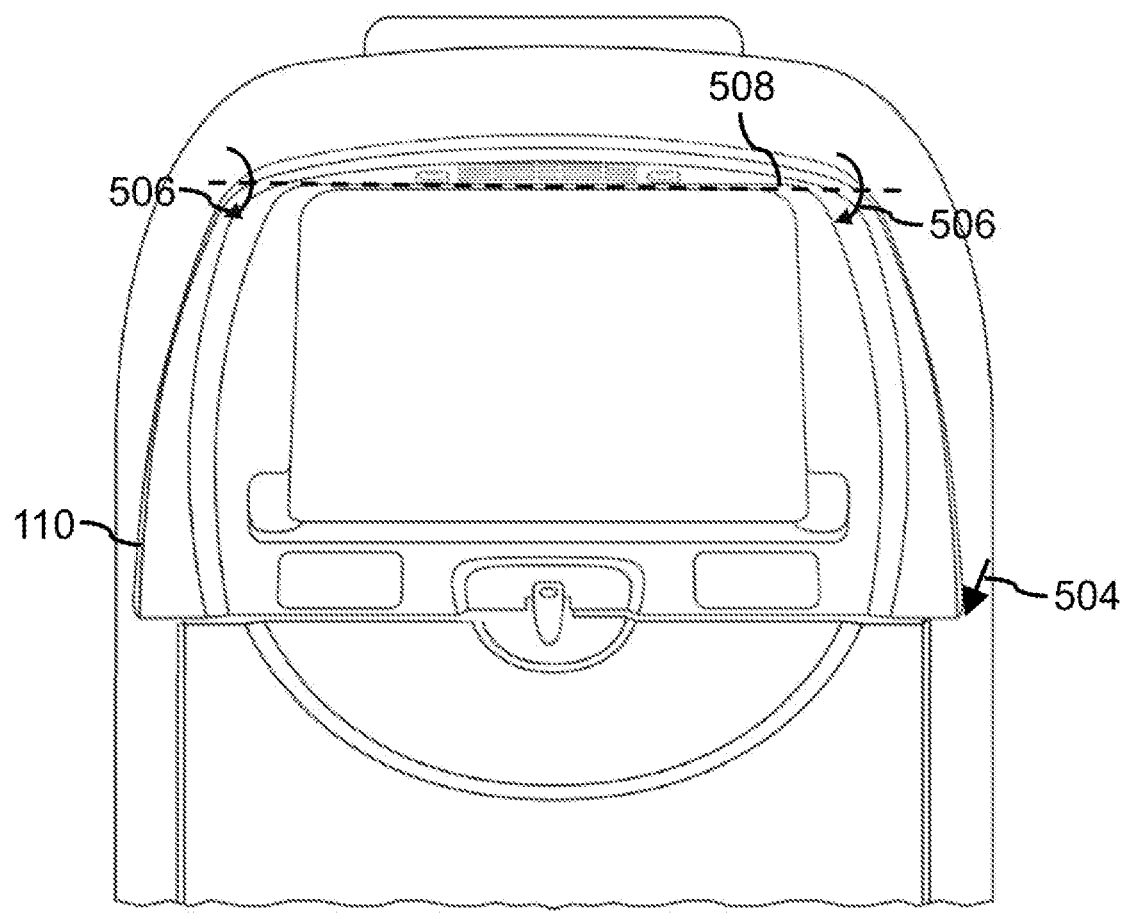
FIG. 5B depicts a rear view of a passenger seat with a bezel and a video display translated outward and pivoted about an upper portion to create a crushable space, in accordance with one or more embodiments of the present disclosure.

Referring now to FIGS. 5A-5B, the bezel 110 is depicted with a crushable space provided. As depicted in FIG. 5A, the crushable space is created after the emergency event has been sensed. The slide mechanism 302 may be designed to translate the bezel 110 parallel to the pre-crash orientation. It is further contemplated that the slide mechanism may pivot the bezel such that the bezel is no longer parallel to the pre-crash orientation. For example, FIG. 5B depicts the bezel translated 504 and pivoted 506 about an upper portion 508 (e.g., a pivot joint) such that the bezel 110 is angled upwards relative to the pre-crash orientation. Pivoting 506 the bezel 110 may be advantageous in deflecting the passenger's head in a direction away from other surfaces. Pivoting 506 the bezel 110 may also be advantageous to manage deceleration loads directionally. In this regard, the velocity or acceleration of the passenger's head may be deflected from a longitudinal forwards vector to a vertical vector at any specific moment in the impact scenario. A prescribed angle of the pivot motion can affect these vector components of acceleration individually to greater or lesser degrees. The pivot 506 may provide an arc with an increased crushing distance along the arc. Although not depicted, the bezel 110 may be pivoted about a lower surface such that the bezel 110 is angled downwards relative to the pre-crash orientation.

Although much of the previous disclosure has described the actuator 204 as moving the bezel 110, this is not intended as a limitation of the present disclosure. Any component of the seatback 104 may be moved towards the passenger sitting behind the passenger seat by the actuator 204. In this regard, the portion of the seatback 104 that moves can be as large or small as desired. In some instances, small surfaces could be activated individually or small subsystems as a single entity. For example, the bezel 110 may be moved together with the display 112 which the bezel 110 surrounds.

Figure 6A:
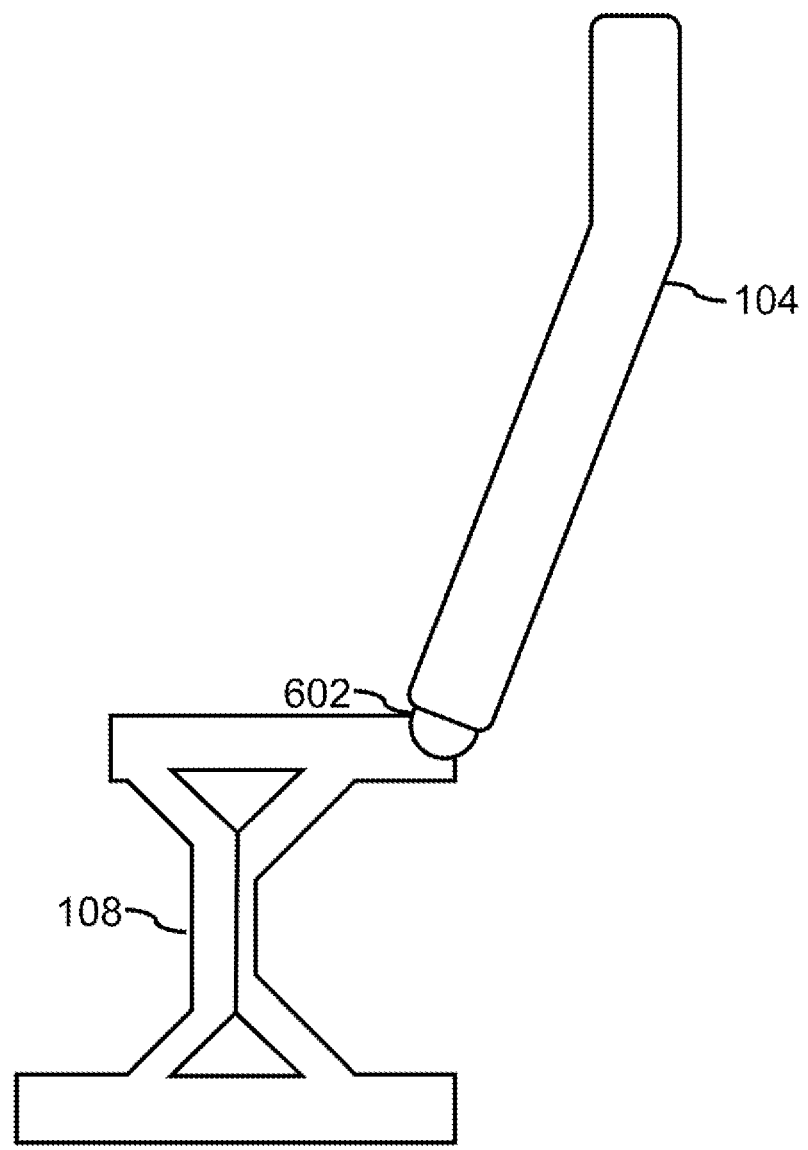
FIG. 6A depicts a partial side view of a passenger seat in an upright position, in accordance with one or more embodiments of the present disclosure.
Figure 6B:
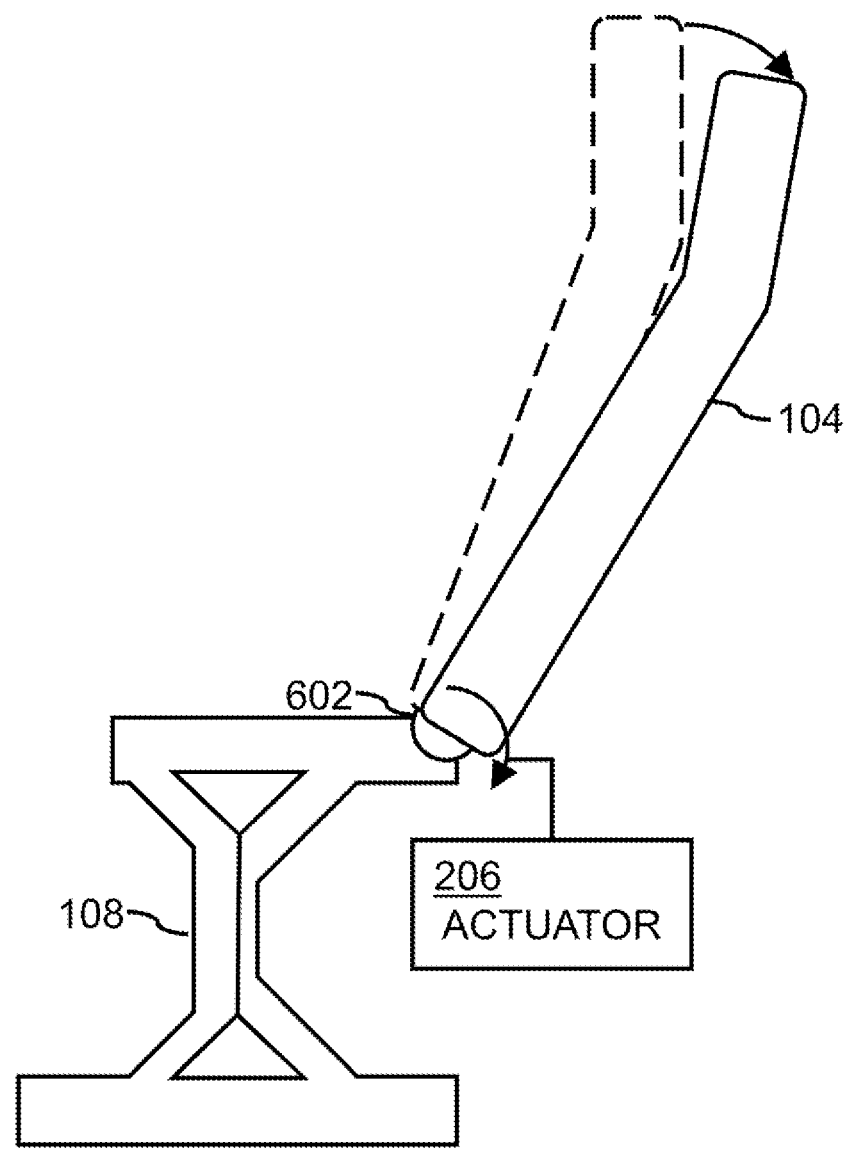
FIG. 6B depicts a partial side view of a passenger seat in an upright position, in accordance with one or more embodiments of the present disclosure.

Referring now to FIG. 6A-6B, an exemplary embodiment of the passenger seat 102 is described. The concepts described herein can also be extended to include moving the seatback 104 in the entirety. In embodiments, the passenger seat 102 includes the actuator 206. The actuator 206 may be provided to move the seatback 104. In some instances, the actuator 206 may include a motive force which is selected to move the mass of the seatback. In this regard, the seatback 104 may include a relatively large mass (e.g., as compared to the bezel 110 or the display 112), such that the force requirements of the actuator 206 are much larger than the force requirements of the actuator 204.

As depicted in FIG. 6A, the seatback 104 is in an upright position. As depicted in FIG. 6B, the seatback 104 is moved to a reclined position by the actuator 206. The actuator 206 may move the seatback 104 to the reclined position in response to receiving the signal from the accelerometer 202. By moving the seatback 104 to the recline position, the impact surface has effectively moved aft toward the oncoming passenger while simultaneously inserting or extending an energy absorbing device into the return trajectory. Upon impact the seatback 104 may return to its upright position. Furthermore, the seatback 104 may include a breakover mechanism, as is known in the art, by which the seatback 104 may rotate further forward from the upright position.

By rotating the seatback 104, an effective pitch between the passenger seats 102 may be reduced. In this regard, the pitch may indicate the distance between the seats. Reducing the pitch may increase the stroke permitted for the passenger seat 102 prior to breakaway. As the occupant's head accelerates toward the seatback 104, the passenger's body may jack-knife their head due to the restraint by a standard lap belt. Thus, the passenger's head may centripetally accelerate in a direction which negatively impacts the head-impact criterion. Advantageously, by rotating the seatback 104, the passenger may impact the seatback 104 in the acceleration (e.g., jack-knife). The reclined position may thus provide an additional range-of-motion for energy absorption. The passenger may impact the seatback 104 over a longer angular range. The additional angular range may increase the impact time, proportionally decreasing the force of the impact felt by the passenger's head, in accordance with laws of mechanics governing impulse. The actuator 206 may thus be advantageous for improving a HIC score.

As discussed previously herein, timing the actuator 206 is desirable to achieve the reclined position prior to impact with the passenger's head. In this regard, the actuator 206 may be engaged immediately upon receiving the trigger signal from the accelerometer 202.

Although not depicted, the actuator 206 may be positioned in a number of locations on the passenger seat 102 to achieve the desired rotation of the seatback 104. For example, the actuator 206 may be put into a pivot joint 602 or spaced relative to a recline lock of the passenger seat 206.

Referring generally again to FIGS. 1A-6B, although example embodiments of the present disclosure are shown and described in an aircraft environment, the concepts of the present disclosure may be configured to operate in alternative and/or additional contexts, unless noted otherwise herein. Therefore, the above description should not be interpreted as a limitation on the disclosure but merely an illustration.

It is further noted herein that, where the environment includes an aircraft environment, it is noted herein the embodiments of aircraft passenger seat apparatus may be configured in accordance with avionics guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A passenger seat comprising:
   a seatback;
   a bezel disposed on a rear surface of the seatback;
   an accelerometer configured to generate a signal in response to detecting an acceleration indicative of an emergency event;
   a slide mechanism coupled between the bezel and the seatback, wherein the slide mechanism is configured to translate the bezel relative to the seatback; wherein the translation of the bezel relative to the seatback causes the bezel to be disposed a distance from the seatback to act as a crushable space for a passenger sitting behind the passenger seat;
   an actuator; wherein the actuator causes the slide mechanism to translate the bezel relative to the seatback in response to the actuator receiving the signal from the accelerometer; and
   an impact attenuator coupled to the slide mechanism; wherein the impact attenuator is configured to absorb an energy upon impact of the passenger with the bezel.

2. The passenger seat of claim 1, wherein the impact attenuator comprises a crushable material.

3. The passenger seat of claim 2, wherein the impact attenuator is pivotably connected to the slide mechanism; wherein the impact attenuator is pivoted from a first position to a second position as the bezel is translated relative to the seatback; wherein the impact attenuator is configured to be crushed to absorb the energy upon the impact of the passenger with the bezel when in the second position.

4. The passenger seat of claim 3, wherein the impact attenuator is pivotably connected to the slide mechanism by a spring for rotating the impact attenuator.

5. The passenger seat of claim 1, wherein the impact attenuator comprises a rod and a cylinder.

6. The passenger seat of claim 5, wherein the cylinder includes a one-way check valve for reducing a force required to extend the rod.

7. The passenger seat of claim 1, wherein the seatback includes at least one frame; wherein the slide mechanism includes a slot; wherein the slide mechanism is coupled to at least one frame by the slot for translating the bezel relative to the seatback.

8. The passenger seat of claim 7, wherein at least one frame includes a roller; wherein the roller is disposed in the slot of the slide mechanism.

9. The passenger seat of claim 1, wherein the bezel is translated relative to the seatback such that the bezel is parallel to a starting position when disposed the distance from the seatback.

10. The passenger seat of claim 1, wherein the slide mechanism is further configured to pivot the bezel relative to the seatback.

11. The passenger seat of claim 10, wherein the bezel pivots about an upper portion.

12. The passenger seat of claim 1, wherein the actuator comprises a pyrotechnic actuator.

13. The passenger seat of claim 12, further comprising a shear pin configured to prevent the bezel from translating relative to the seatback; wherein the pyrotechnic actuator is configured to shear the shear pin in response to receiving the signal.

* * * * *